(12) United States Patent
Ellis

(10) Patent No.: US 10,555,392 B1
(45) Date of Patent: *Feb. 4, 2020

(54) SYSTEM AND METHOD FOR CONTROLLING COLOR OUTPUT OF LINEAR RGB LED ARRAYS

(71) Applicant: Mary L. Ellis, Boulder, CO (US)

(72) Inventor: Mary L. Ellis, Boulder, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 16/106,762

(22) Filed: Aug. 21, 2018

Related U.S. Application Data (60) Continuation-in-part of application No. 15/040,186, filed on Feb. 10, 2016, now Pat. No. 10,091,853,
(Continued)

(51) Int. Cl.
*H05B 33/08* (2006.01)
*H05B 37/02* (2006.01)
(Continued)

(52) U.S. Cl.
CPC .......... *H05B 33/0854* (2013.01); *A47G 1/02* (2013.01); *A47G 1/0622* (2013.01); *F21V 3/049* (2013.01); *F21V 33/004* (2013.01); *H05B 33/0803* (2013.01); *H05B 33/0806* (2013.01); *H05B 33/0845* (2013.01); *H05B 33/0872* (2013.01); *H05B 33/0896* (2013.01); *H05B 37/0227* (2013.01); *F21W 2131/302* (2013.01);
(Continued)

(58) Field of Classification Search
CPC ......... F21Y 2103/003; F21Y 2105/001; F21Y 2105/003; H01L 2924/12041; H05B 37/02; H05B 37/0218; H05B 33/0806; H05B 33/0812; H05B 33/0815; H05B 33/0845; F21W 2131/302; F21W 2101/08
See application file for complete search history.

(56) References Cited

U.S. PATENT DOCUMENTS

8,988,005 B2 * 3/2015 Jungwirth .......... H05B 33/0824
315/122
9,756,706 B2 * 9/2017 Breuer ............... H05B 37/0272
(Continued)

*Primary Examiner* — Vibol Tan
(74) *Attorney, Agent, or Firm* — William J. Benman; Benman, Brown & Williams (57) ABSTRACT

An illumination system comprising a light source including a linear array of color variable light emitting elements; a power supply coupled to the array; and a power regulating circuit, coupled between the power supply and the array, effective to activate the light emitting elements to emit light in accordance with a color profile that varies as a function of location on at least a portion of the array. In a specific implementation, the invention includes a camera or other sensor for detecting ambient lighting conditions. This enables the system to adjust the array to achieve ambient lighting conditions in accordance with user preferences or profile. In yet another embodiment, lighting conditions at a remote location at a specific time are sensed by a smartphone camera or other device and coupled to the power regulating circuit for use in adjusting the array to achieve a match of ambient lighting to that or a remote location and time, subject to user adjustments, profile and/or preferences. In the best mode, user commands are entered via a smartphone or via voice using a virtual assistant.

24 Claims, 7 Drawing Sheets

Related U.S. Application Data which is a division of application No. 14/254,188, filed on Apr. 16, 2014, now Pat. No. 9,295,130.

(51) Int. Cl.

| | | |
|---|---|---|
| *F21V 33/00* | (2006.01) | |
| *A47G 1/06* | (2006.01) | |
| *A47G 1/02* | (2006.01) | |
| *F21V 3/04* | (2018.01) | |
| *F21W 131/302* | (2006.01) | |
| *F21Y 115/10* | (2016.01) | |
| *F21Y 103/10* | (2016.01) | |

(52) U.S. Cl.
CPC ....... *F21Y 2103/10* (2016.08); *F21Y 2115/10* (2016.08); *Y02B 20/44* (2013.01)

(56) References Cited

U.S. PATENT DOCUMENTS

| | | | | |
|---|---|---|---|---|
| 9,974,140 | B2* | 5/2018 | Seki | H05B 33/0827 |
| 10,009,111 | B2* | 6/2018 | Frodsham | H04B 10/116 |
| 10,136,485 | B1* | 11/2018 | Coetzee | H05B 33/0809 |
| 2005/0273237 | A1* | 12/2005 | Huang | H05B 33/0869 |
| | | | | 701/49 |
| 2006/0092652 | A1* | 5/2006 | Lau | B60Q 1/268 |
| | | | | 362/503 |
| 2012/0307490 | A1* | 12/2012 | Ellis | F21V 3/049 |
| | | | | 362/235 |
| 2013/0141010 | A1* | 6/2013 | Reed | H05B 37/02 |
| | | | | 315/294 |
| 2014/0084809 | A1* | 3/2014 | Catalano | H05B 33/0845 |
| | | | | 315/292 |
| 2015/0076993 | A1* | 3/2015 | Mohan | G01S 5/0027 |
| | | | | 315/153 |
| 2015/0282282 | A1* | 10/2015 | Breuer | H05B 37/0272 |
| | | | | 315/152 |
| 2016/0165387 | A1* | 6/2016 | Nhu | H04L 67/10 |
| | | | | 455/41.1 |

\* cited by examiner

PRIOR ART

Fig. 8

SYSTEM AND METHOD FOR CONTROLLING COLOR OUTPUT OF LINEAR RGB LED ARRAYS

REFERENCE TO RELATED APPLICATION

This is a Continuation-in-Part of copending U.S. patent application entitled SYSTEM AND METHOD FOR PROVIDING GRADIENT INTENSITY ILLUMINATION, Ser. No. 15/040,186, filed Feb. 10, 2016 by M. Ellis, the teachings of which are hereby incorporated herein by reference.

BACKGROUND OF THE INVENTION

Field of the Invention

The present invention relates to lighting systems. More specifically, the present invention relates to illumination systems used in dressing rooms and other applications.

Description of the Related Art

Due to the typical lighting arrangement, customers in a retail dressing room are all too often unhappy with the way they see themselves in the mirror while trying on clothes. (See *Effects of Dressing Room Lighting Direction on Consumers' Perception of Self and Environment*, Baumstarck, A., Park, N-K; University of Florida, 2009.) The perception is usually that the conditions in the room highlight, accentuate, and/or create under-eye bags, uneven skin tone and texture, wrinkles, less-than-desirable body fat distribution, cellulite, bulging veins, odd skin color, etc.

There are many blog and forum entries as well as articles on the subject on the Internet in which most women—and a surprising number of men—express agreement. For these people, the dressing room experience is often painful and seldom pleasant, and indeed affects their purchasing decisions. As a result, customers often choose: 1) to buy only what they perceive as absolutely necessary; 2) to take clothes home to try on in more pleasing conditions and then return what doesn't work; 3) to forego the entire experience and make their purchases on-line; or 4) all too often to buy nothing out of frustration and disappointment. Hence, in the apparel business it is often the that "the sale is made in the dressing room."

The problem is primarily an issue of lighting, with most dressing rooms being lit by overhead sources—usually fluorescent or halogen bulbs—that are often very harsh and/or color-distorted. Such lighting casts hard shadows, often at unflattering color temperatures, which are responsible for most of the unpleasant effects. But remarkably little has ever been done to optimize lighting conditions in retail dressing rooms in order to affect—i.e., increase—sales.

Conventional solutions include the use of fluorescent or incandescent sconces placed alongside the mirror. However, this approach offers little improvement inasmuch as the sconces typically don't give off enough light.

A few years ago, dressing room atmospherics as a factor in sales came on the radar in the apparel industry and consequently the retail design community. As a result, poor dressing room conditions have been cosmetically improved fairly recently: Some rooms have been cleaned up, painted, provided with more hooks, and new carpeting. Higher-end shops made their dressing rooms a luxury haven, bringing in over-sized gilt-frame mirrors and poufy furnishings. Some tried to deal with the lighting—usually by simply dimming and/or warming it to the point where it was difficult to see, i.e., near-candlelight.

Some stores, including a few chains, have employed side-lit mirrors, utilizing either fluorescent or incandescent lighting. Such side-lit mirrors are bulky and often unattractive, and require a high level of maintenance inasmuch as the bulbs burn out quickly. Also, these conventional systems generate substantial heat, which may affect a building's HVAC systems, and may present a potential burn risk for customers if not shielded properly. Other hazards include the possibility of broken or shattered glass, and the toxic release of mercury from broken fluorescent bulbs. Additionally, these conventional systems are generally part of the architecture of the space, and must be designed into the room; i.e., they cannot be dropped into any existing space.

Accordingly, a need remained in the art for an improved system or method for providing illumination for use with mirrors in retail dressing rooms.

U.S. patent application entitled ILLUMINATED MIRROR DESIGN AND METHOD, Ser. No. 13/134,229, filed May 30, 2011 by M. Ellis, the teachings of which are hereby incorporated herein by reference, addressed the need in the art by providing an illumination system of the present invention with an elongate rectangular mirror; a first diffuser mounted on a first side of the mirror in parallel relation along a longitudinal axis thereof; a second diffuser mounted on a second side of the mirror in parallel relation along the longitudinal axis; and an array of light emitting diodes mounted along an edge of the first and the second diffusers. The disclosed ELAVUE mirror is a modular integrated mirror and lighting unit or appliance that offers the potential to enhance customer perceptions of themselves in (and out of) the clothes they are considering, potentially resulting in longer stays, more clothing fittings, a more enjoyable shopping experience, and, ultimately, more sales.

While the ELAVUE system addressed the need in the art, it provides substantially uniform illumination from top to bottom. However, gradient illumination was seen as more desirable inasmuch as when lighting is uniformly distributed up and down, it can create a subtle but noticeable effect (especially at higher intensities) of too much light coming from the lower part of the lighting panels, creating undesirable shadowing from below, and thus yielding a somewhat distorted, effect of overhead lighting (mitigation of which is one of the biggest drivers behind the concept of the Elavue Mirror disclosed and claimed in the above-referenced Ellis application), only in reverse.

Thus, a need was recognized for a solution that would soften and/or alleviate that effect by altering the distribution of light along the height of the panels such that the highest intensity comes from the general level of head and torso area, with fading to a much lower intensity from mid-height (approximately waist/hip area) to bottom/feet level. The lower part being still illuminated well enough to enhance viewing, differentiate colors, etc. (i.e., not completely unlit), but not as fully lit as the head/torso area.

This need was addressed by SYSTEM AND METHOD FOR PROVIDING GRADIENT INTENSITY ILLUMINATION FOR LIGHTED MIRRORS FOR DRESSING ROOMS AND OTHER APPLICATIONS, Ser. No. 15/040, 186, filed Feb. 10, 2016 by M. Ellis, now issued as U.S. Pat. No. 10,091,853, the teachings of which are incorporated herein by reference.

While these applications addressed a need for a gradient intensity LED based illumination system, a concomitant need remains in the art for a system and method for varying the color output by full color (RGB) LEDs for dressing room and other illumination applications.

SUMMARY OF THE INVENTION

The need in the art is addressed by the illumination system and method of the present invention. In the illustrative embodiment, the inventive system is a light source including a linear array of color variable light emitting elements; a power supply coupled to the array; and a power regulating circuit, coupled between the power supply and the array, effective to activate the light emitting elements to emit light in accordance with a color profile that varies as a function of location on at least a portion of the array.

In a specific implementation, the invention includes a camera, or other sensor for detecting ambient lighting conditions, and logic that enables the system to adjust the array to achieve ambient lighting conditions in accordance with user preferences or profile. In yet another embodiment, lighting conditions at a remote location at a specific time are sensed by a smartphone camera or other device and coupled to the power regulating circuit for use in adjusting the array to achieve a match of ambient lighting to that or a remote location and time, subject to user adjustments, profile and/or preferences. In the best mode, user commands are entered via a smartphone or via voice using a virtual assistant such as Amazon's Alexa, Google's Home or Apple's Siri.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

The present invention is a light source including a linear array of color variable light emitting elements; a power supply coupled to the array; and a power regulating circuit, coupled between the power supply and the array, effective to activate the light emitting elements to emit light in accordance with a color profile that varies as a function of location on at least a portion of the array.

In a specific implementation, the invention includes a camera, or other sensor for detecting ambient lighting conditions, and logic that enables the system to adjust the array to achieve ambient lighting conditions in accordance with user preferences or profile. In yet another embodiment, lighting conditions at a remote location at a specific time are sensed by a smartphone camera or other device and coupled to the power regulating circuit for use in adjusting the array to achieve a match of ambient lighting to that or a remote location and time, subject to user adjustments, profile and/or preferences. In the best mode, user commands are entered via a smartphone or via voice using a virtual assistant such as Amazon's Alexa, Google's Home or Apple's Siri.

In the lighted mirror implementation discussed below, the invention provides a unique arrangement for optimizing lighting and viewing conditions in the dressing room, where the sale is often ultimately made, thereby improving customer experience in a store and increasing clothing sales. However, the invention is not limited thereto. Those of ordinary skill in the art will appreciate that the color variable light source technology of the present invention may be utilized in a variety of applications without departing from the scope thereof.

Figure 1:
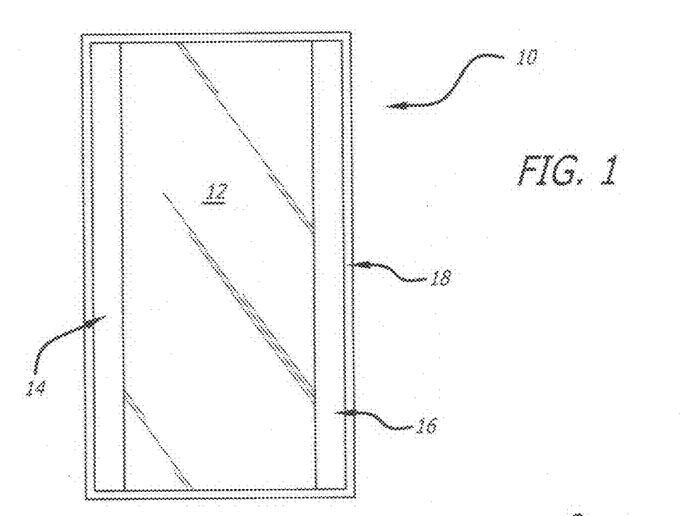
FIG. 1 is a frontal view of an illustrative embodiment of a lighted mirror implemented in accordance with the teachings of the present invention.

FIG. 1 is a frontal view of an illustrative embodiment of a modular integrated lighted mirror implemented in accordance with the teachings of the present invention. The system 10 includes a mirror 12 fabricated of glass, metal, Plexiglas or other suitably reflective surface. In the best mode, the mirrors are fabricated of standard high-quality (e.g. ¼ inch) distortion-free glass. The mirror 12 is planar and has a longitudinal axis not shown along the length thereof. In the illustrative embodiment, the mirror is 24 inches by 72 inches. However, the present teachings are not limited to the size or shape of the mirror. The mirror is sandwiched between two illumination elements 14 and 16 and is disposed within an optional decorative frame 18.

The illumination elements 14 and 16 are light diffusers that distribute light from light emitting diodes (LEDs), organic light emitting diodes OLEDS or other suitable light emitting devices. The arrangement of LEDs is illustrated more clearly with reference to FIGS. 2 and 3.

Figure 2:
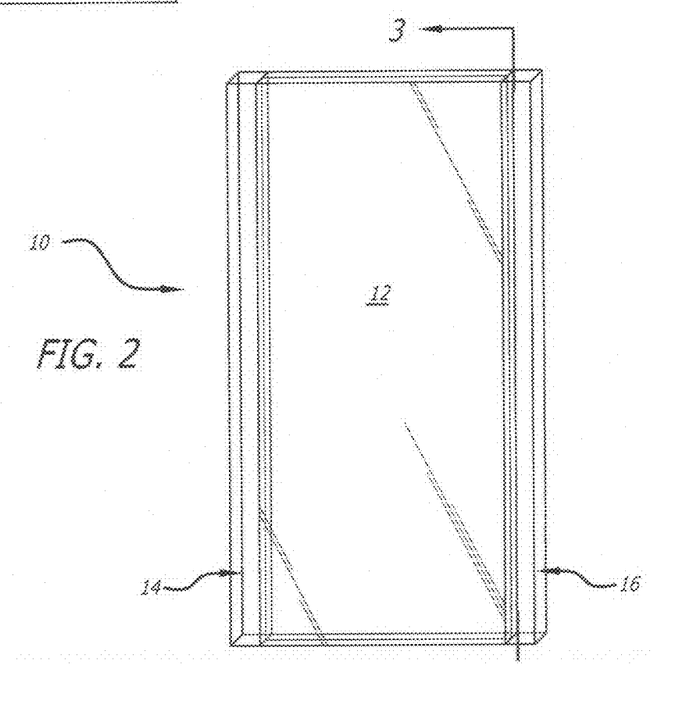
FIG. 2 is a simplified schematic perspective view of the lighted mirror of FIG. 1.

FIG. 2 is a simplified schematic perspective view of the lighted mirror of FIG. 1. In accordance with the teachings of the above-referenced Ellis '229 application, the teachings of which have been incorporated herein by reference, the LEDs are each powered with the same amount of energy. Accordingly, the LED output by the LEDs is uniform and exhibit a flat profile as illustrated in FIG. 3.

Figure 3:
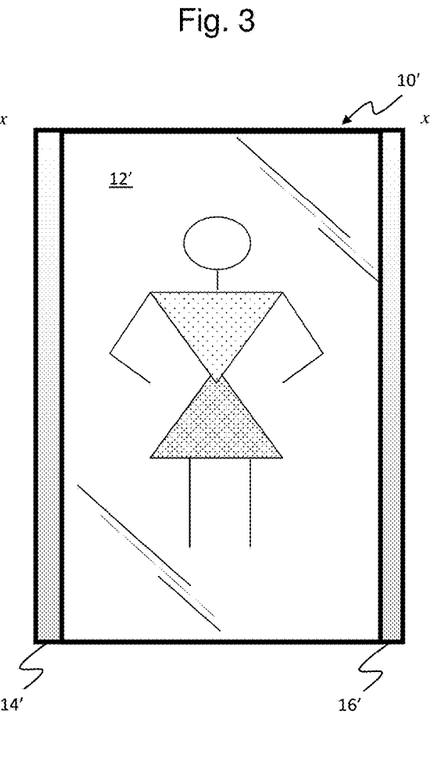
FIG. 3 is a diagram that illustrates the LED output profile of a lighted mirror implemented in accordance with the teachings of prior filed the Ellis '229 application.

FIG. 3 is a diagram that illustrates the LED output profile of a lighted mirror implemented in accordance with the teachings of prior filed the Ellis '229 application.

Figure 3A:
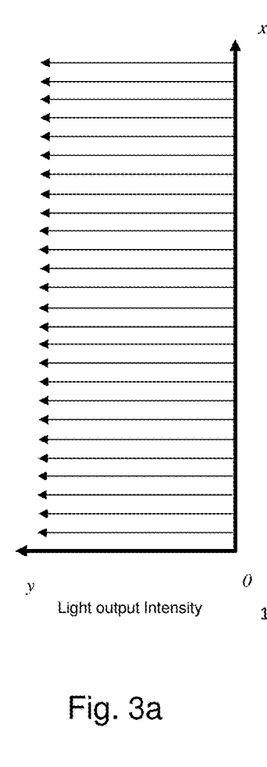
FIG. 3a illustrates the LED output intensity profile distribution of the first LED array as a function of location from the bottom of the array to the top thereof.

FIG. 3a illustrates the LED output intensity profile distribution of the first LED array 14' as a function of location from the bottom of the array to the top thereof.

Figure 3B:
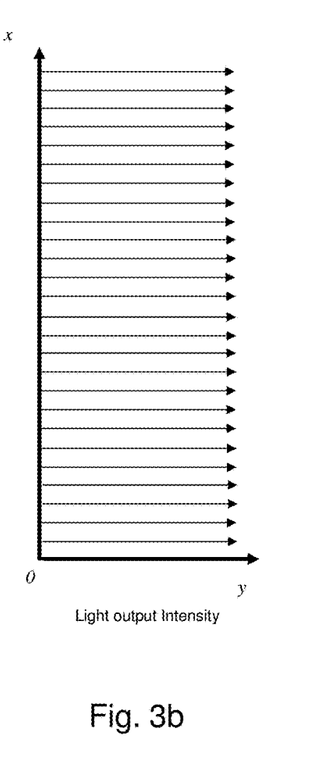
FIG. 3b illustrates the LED output intensity profile distribution of the second LED array as a function of location from the bottom of the array to the top thereof.

FIG. 3b illustrates the LED output intensity profile distribution of the second LED array 16' as a function of location from the bottom of the array to the top thereof. In FIGS. 3a and 3b, the intensity distribution profile is relatively uniform from top to bottom. As noted above, this can create a subtle but noticeable effect (especially at higher intensities) of too much light coming from the lower part of the lighting panels and thereby create undesirable shadowing from below. This can yield a somewhat distorted, undesirable image in the mirror. The effect is similar to the unflattering shadowing effect of overhead lighting (mitigation of which is one of the biggest drivers behind the concept of the Elavue Mirror disclosed and claimed in the above-referenced Ellis application), only in reverse.

Accordingly, the LED output color distribution profile was adjusted in the '186 application to address the shortcomings of the flat color distribution profile of the '229 application set forth above. This is illustrated in FIG. 4 below.

Figures 4, 4A, 4B:
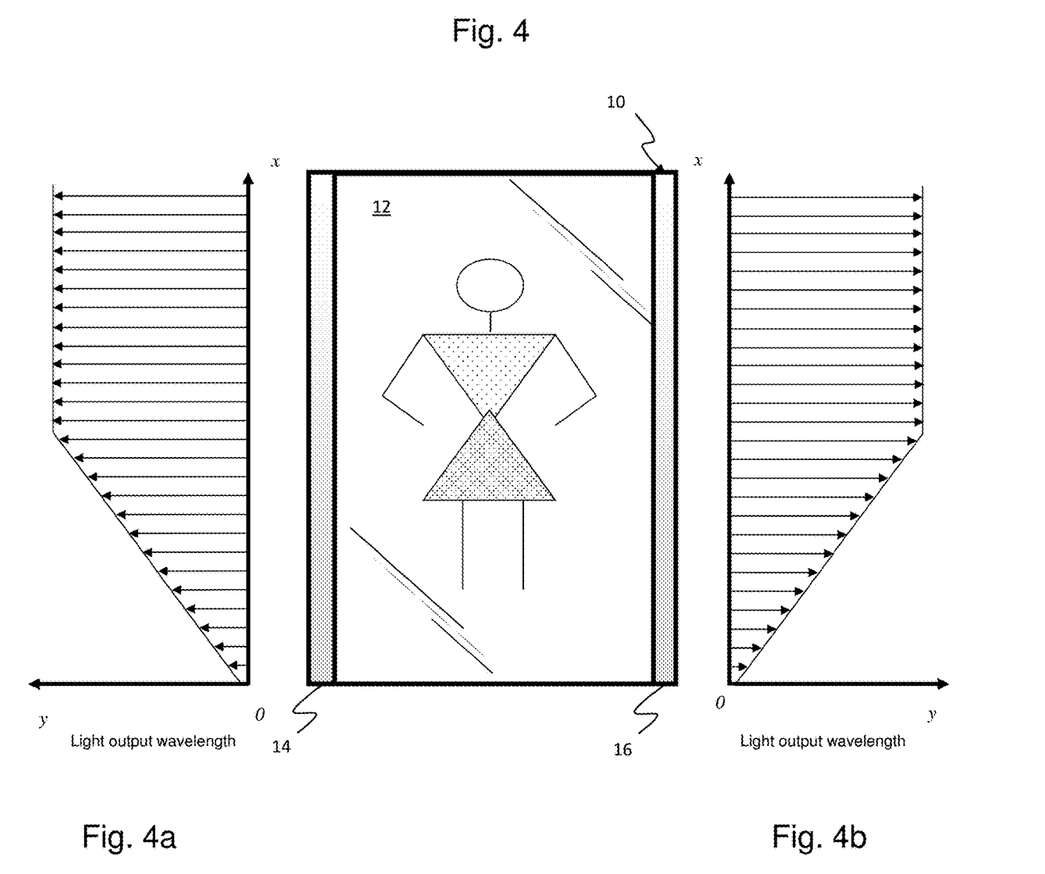
FIG. 4 is a diagram that illustrates the output profile of a lighted mirror implemented in accordance with the teachings of the present application.
FIG. 4a illustrates the output color profile distribution of a first array of light emitting elements, powered in accordance with present teachings to provide a tapered output color distribution profile, as a function of location from the bottom of the array to the top thereof.
FIG. 4b illustrates the output color profile distribution of a second array of light emitting elements, powered in accordance with present teachings to provide a tapered output color distribution profile, as a function of location from the bottom of the array to the top thereof.

FIG. 4 is a diagram that illustrates the LED output profile of a lighted mirror implemented in accordance with the teachings of the present application.

FIG. 4a illustrates the LED output color profile distribution of a first array of light emitting elements 14, powered in accordance with present teachings to provide a tapered output color distribution profile, as a function of location from the bottom of the array to the top thereof.

FIG. 4b illustrates the LED output color profile distribution of a second array of light emitting elements 16, powered in accordance with present teachings to provide a tapered output color distribution profile, as a function of location from the bottom of the array to the top thereof.

Figure 5:
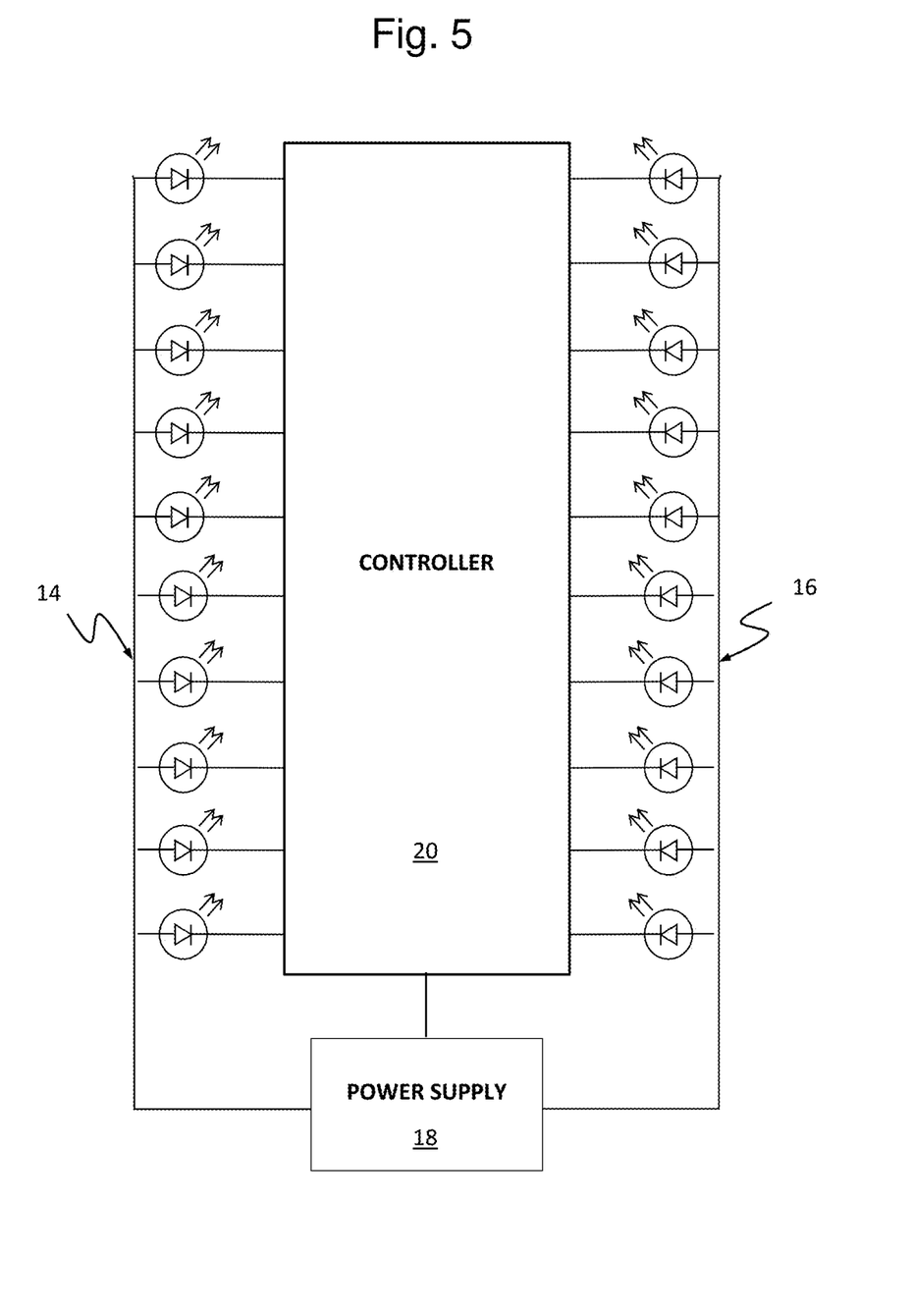
FIG. 5 is a simplified schematic diagram of an illustrative analog implementation of a scheme for effecting the tapered output color distribution profile of FIGS. 4a and 4b.

FIG. 5 is a simplified schematic diagram of an illustrative analog implementation of a scheme for effecting the tapered output light color distribution profile of FIGS. 4a and 4b. As shown in the figure, the light emitting elements, represented by $LEDs_{1-n}$ receive power from a power supply 18. The power supply 18 is designed or chosen to power the light emitting elements in the arrays 14 and 16 to provide adequate and optimized lighting for the intended environment in accordance with the teachings of the Ellis '229 application. However, in accordance with the present teachings, the LEDs are color variable LEDs such as the RGB LED pictured in FIG. 6.

Figure 6:
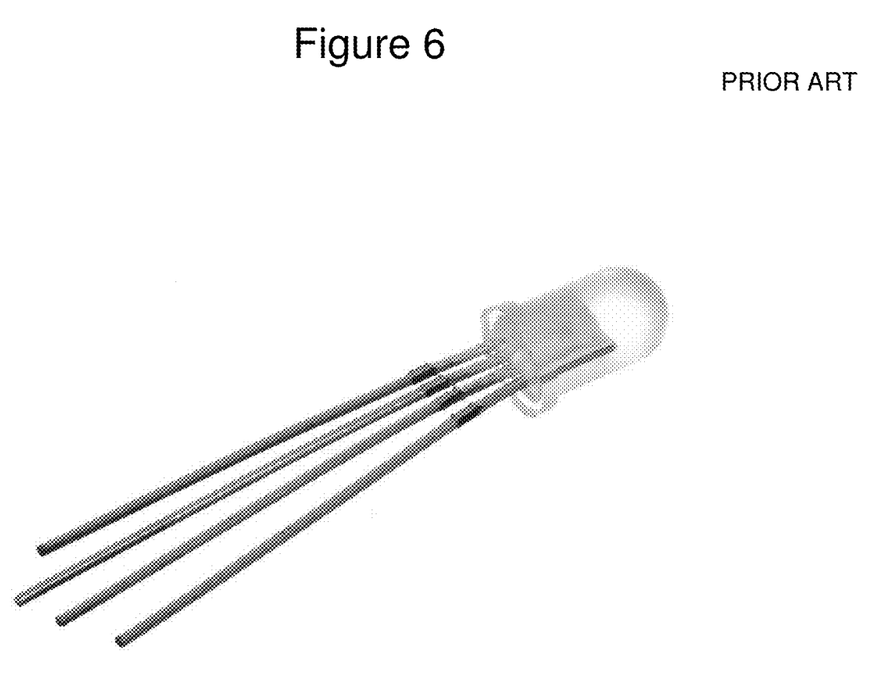
FIG. 6 shows a conventional RGB LED suitable for use in accordance with an illustrative embodiment of the present invention.

FIG. 6 shows a conventional RGB LED suitable for use in the arrays 14 and 16 in accordance with an illustrative embodiment of the present invention. See Oomlout—RGB LED-RGBL-01-05, CC BY-SA 2.0, https://commons.wikimedia.org/w/index.php?curid=19867037.

Figure 7:
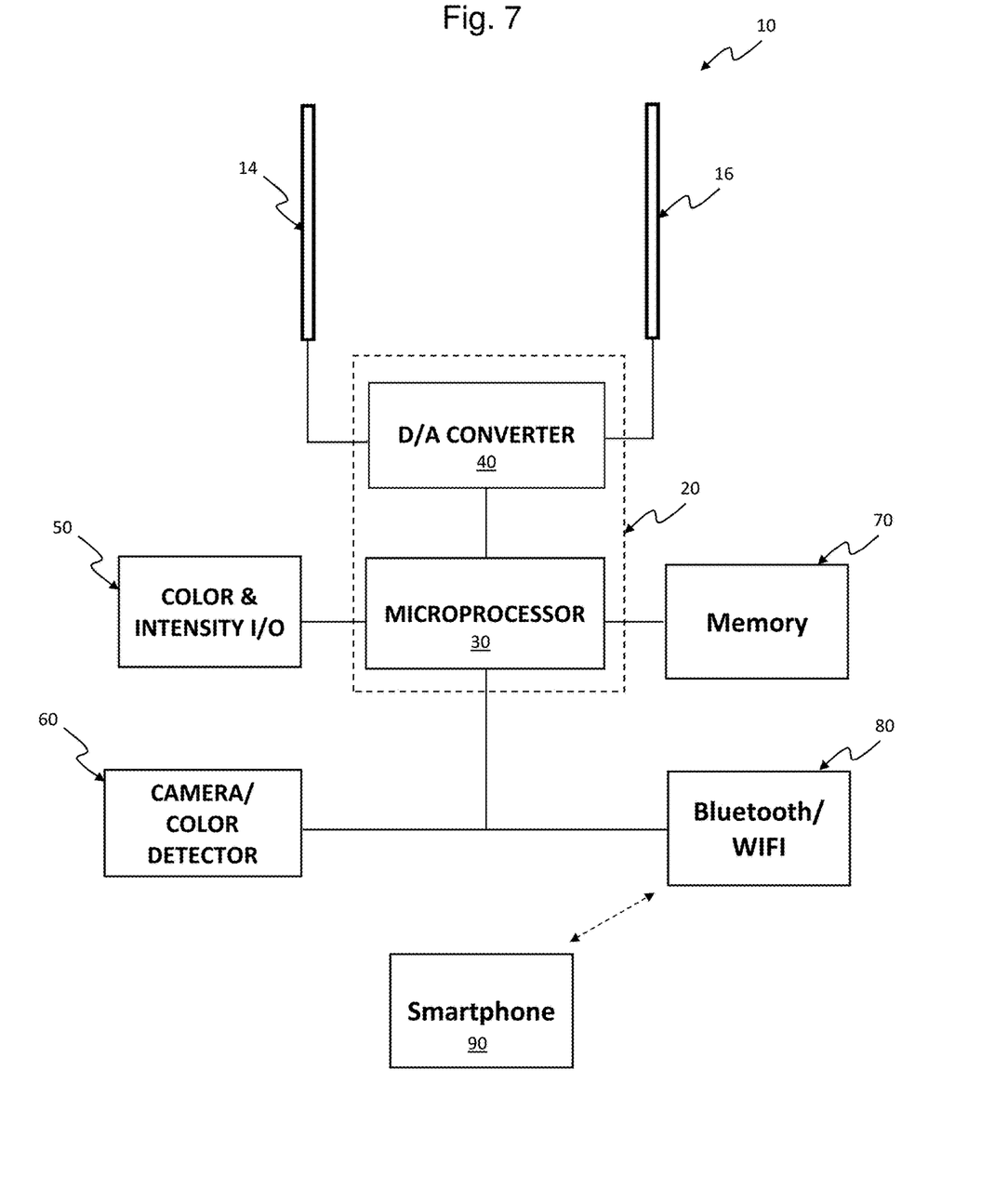
FIG. 7 shows an illustrative embodiment of a digital scheme for effecting a desired color distribution profile in accordance with the present teachings.
Figure 8:
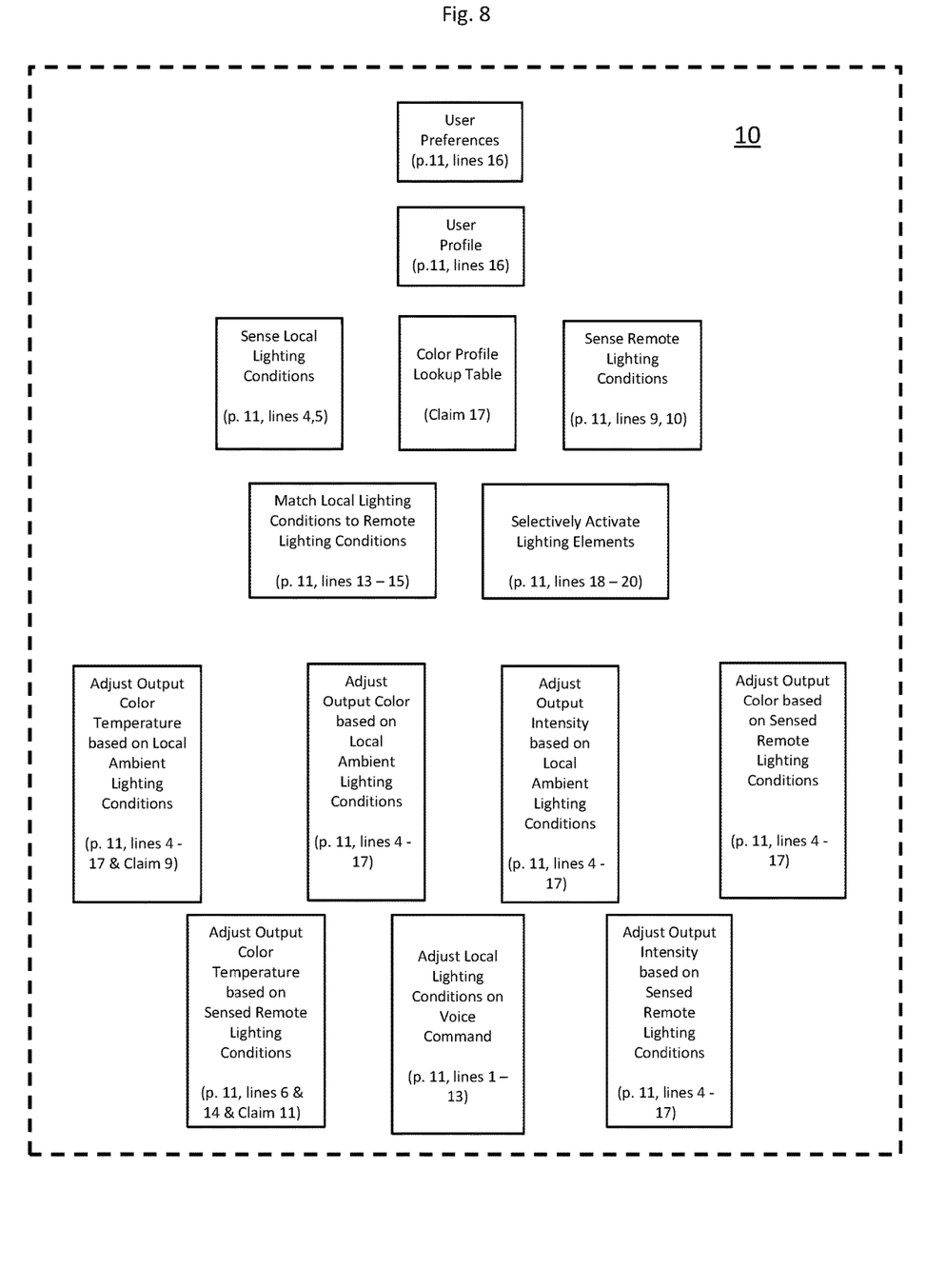
FIG. 8 is a diagram that illustrates the operations performed by the system depicted in FIG. 7.

FIG. 7 shows an illustrative embodiment of a digital scheme for effecting a desired color distribution profile in accordance with the present teachings. As shown in FIG. 7, the controller drives the LED arrays 14 and 16. The controller 20 includes a microprocessor 30 and an optional digital to analog converter 40. (The D/A converter may not be needed if the LEDs can be driven with digital signals.) If employed, the D/A converter 40 translates digital commands from the microprocessor 30 into analog signals effective to drive the LEDs to output light at the desired wavelength and intensity. The system controller 20 receives input from a user interface 50 and camera and/or color detector 60 and outputs digital signals required to effect an optimum or selected color distribution profile to the D/A converter 40 that varies as a function of location on at least a portion of at least one of the arrays. In the best mode, user voice commands are entered via a smartphone or a virtual assistant such as Amazon's Alexa or Google's Home.

In a first embodiment, the invention includes uses the camera, or other sensor, 60 to detect ambient lighting conditions, and logic stored in tangible memory 70 that enables the controller 20 to adjust the color and intensity of the LEDs individually in each array to achieve ambient lighting conditions in accordance with user preferences or profile.

In a second alternative embodiment, lighting conditions at a remote location at a specific time are sensed by a camera on a smartphone 90 or other device which is wirelessly coupled to the power regulating circuit (controller 20) via Bluetooth, WIFI or other wired or wireless connection 80. This lighting condition data from the remote location is then stored in memory 70. The controller 20 uses this data to individually adjust the color and intensity of the LEDs the array to achieve a match of ambient lighting conditions to that of a remote location (e.g. office, school, restaurant, night club, store, outdoors, etc.) and at any specific time, subject to user adjustments, profile and/or preferences.

The controller 20 can selectively drive some LEDs with commands while driving other LEDs to output basic white light to mitigate the problem of narrow band source typically experienced with conventional color LEDs.

In FIG. 7, the power supply 18 is omitted for simplicity, however, it will be understood by those skilled in the art that the power supply is connected to the components depicted in the figure.

The present invention has been described herein with reference to a particular embodiment for a particular application. Those having ordinary skill in the art and access to the present teachings will recognize additional modifications, applications and embodiments within the scope thereof. For example, the teachings disclosed herein are not limited to a dressing room application. On the contrary, the present teachings may be used in any application requiring lighting. Further, the arrays may be mounted vertically or horizontally and the present teachings are not limited to the use of linear arrays. The light elements can be other technologies besides LED and other shapes including square, rectangular, circular, irregular, etc. without departing from the scope of the present teachings.

It is therefore intended by the appended claims to cover any and all such applications, modifications and embodiments within the scope of the present invention.

The invention claimed is:
1. An illumination system comprising:
   a light source including a linear array of color variable light emitting elements;
   a power supply coupled to the array; and
   a power regulating circuit coupled between the power supply and the array
   whereby the light emitting elements emit light in accordance with a tapered color profile that varies as a function of location on at least a portion of the array.

2. The invention of claim 1 further including an optical detector for detecting ambient lighting conditions operationally coupled to the power regulating circuit.

3. The invention of claim 2 wherein the optical detector is a camera.

4. The invention of claim 1 further including a smartphone for detecting remote lighting conditions operationally coupled to the power regulating circuit.

5. The invention of claim 1 wherein the power regulating circuit includes an arrangement for selectively driving some of the light emitting elements with commands while driving other elements to output basic white light to mitigate the problem of narrow band source.

6. The invention of claim 1 wherein the power regulating circuit includes a mechanism for matching local lighting conditions to sensed remote lighting conditions.

7. The invention of claim 6 further including a mechanism for further adjusting the local lighting conditions on voice command.

8. The invention of claim 1 wherein the power regulating circuit includes a mechanism for adjusting output color based on local ambient lighting conditions.

9. The invention of claim 8 wherein the power regulating circuit includes a mechanism for adjusting output color temperature based on local ambient lighting conditions.

10. The invention of claim 9 wherein the power regulating circuit includes a mechanism for adjusting output intensity based on local ambient lighting conditions.

11. The invention of claim 1 wherein the power regulating circuit includes a mechanism for adjusting output color based on sensed remote lighting conditions.

12. The invention of claim 11 wherein the power regulating circuit includes a mechanism for adjusting output color temperature based on sensed remote lighting conditions.

13. The invention of claim 12 wherein the power regulating circuit includes a mechanism for adjusting output intensity based on sensed remote lighting conditions.

14. The invention of claim 1 wherein the power regulating circuit includes an arrangement for changing the profile.

15. The invention of claim 14 wherein the arrangement for changing the profile includes a user interface.

16. The invention of claim 1 wherein the power regulating circuit includes a system controller.

17. The invention of claim 16 wherein the system controller includes a lookup table for providing any color profile by the array.

18. The invention of claim 1 wherein the power regulating circuit includes an arrangement for regulating power to each of the light emitting elements individually.

19. An illumination system comprising:
a light source including a linear array of light emitting elements;
a power supply coupled to the array;
a controller coupled between the power supply and the array whereby the light emitting elements emit light as a function of location in the array in accordance with a color profile, the controller including a mechanism for matching local ambient color conditions to remote lighting conditions;
a camera or color detector operationally coupled to the controller for detecting local ambient lighting conditions;
a wireless mobile communications and computing platform having a camera for detecting remote lighting conditions; and
a communications interface for operationally coupling the controller to the mobile communications and computing platform.

20. An illumination method including the steps of:
providing a light source including a linear array of color variable light emitting elements;
coupling a power supply to the array; and
coupling a power regulating circuit between the power supply and the array that controls the light emitting elements in accordance with a tapered color profile that varies as a function of location on at least a portion of the array.

21. An illumination system comprising:
a light source including a linear array of color variable light emitting elements;
a power supply coupled to the array;
a power regulating circuit coupled between the power supply and the array whereby the light emitting elements emit light in accordance with a color profile that varies as a function of location on at least a portion of the array; and
a smartphone for detecting remote lighting conditions operationally coupled to the power regulating circuit.

22. An illumination system comprising:
a light source including a linear array of color variable light emitting elements;
a power supply coupled to the array; and
a power regulating circuit coupled between the power supply and the array wherein the power regulating circuit includes an arrangement for selectively driving some of the light emitting elements with commands while driving other elements to output basic white light to mitigate the problem of narrow band source,
whereby the light emitting elements emit light in accordance with an output color profile that varies as a function of location on at least a portion of the array.

23. An illumination system comprising:
a light source including a linear array of color variable light emitting elements;
a power supply coupled to the array; and
a power regulating circuit coupled between the power supply and the array whereby the light emitting elements emit light in accordance with a color profile that varies as a function of location on at least a portion of the array, the power regulating circuit includes a mechanism for matching local lighting conditions to sensed remote lighting conditions.

24. An illumination system comprising:
an elongate mirror:
a light source including a linear array of color variable light emitting elements mounted along at least one side of said mirror;
a power supply coupled to the array; and
a power regulating circuit coupled between the power supply and the array
whereby the light emitting elements emit light in accordance with a color profile that varies as a function of location on at least a portion of the array.

* * * * *